United States Patent [19]

Wörmann

[11] Patent Number: 5,254,009

[45] Date of Patent: Oct. 19, 1993

[54] CONTROLLABLE VIBRATION DAMPER FOR MOTOR VEHICLES

[75] Inventor: Thomas Wörmann, Wuppertal, Fed. Rep. of Germany

[73] Assignee: August Bilstein GmbH & Co. KG, Ennepetal, Fed. Rep. of Germany

[21] Appl. No.: 859,099

[22] Filed: Mar. 27, 1992

[30] Foreign Application Priority Data

May 23, 1991 [DE] Fed. Rep. of Germany ....... 4116805

[51] Int. Cl.$^5$ .............................................. H01R 19/40
[52] U.S. Cl. ........................................ 439/34; 188/299
[58] Field of Search .................. 439/34; 188/299, 319

[56] References Cited

U.S. PATENT DOCUMENTS

| | | | |
|---|---|---|---|
| 4,846,318 | 7/1989 | Groves | 188/299 |
| 5,090,524 | 2/1992 | Miller et al. | 439/34 |
| 5,106,307 | 4/1992 | Mouissie | 439/34 |

FOREIGN PATENT DOCUMENTS

| | | |
|---|---|---|
| 2911768 | 3/1979 | Fed. Rep. of Germany . |
| 3313388 | 1/1984 | Fed. Rep. of Germany . |

*Primary Examiner*—Gary F. Paumen
*Attorney, Agent, or Firm*—Max Fogiel

[57] ABSTRACT

A variable dashpot for motor vehicles A hollow piston rod is secured to the vehicle's body by a fastener. The piston rod accommodates electric connections that extend to one or more sensors and/or one or more valves The connections are also connected by way of male and female connectors (25) to additional connections. The additional connections extend to processing and activating circuitry. The object is to protect sensitive parts of the dashpot. The female connector (14) is secured in the top of the piston rod (2) and its associated male connector (15) can be connected to it. Such connectors can be accommodated in even a narrow piston rod.

7 Claims, 2 Drawing Sheets

CONTROLLABLE VIBRATION DAMPER FOR MOTOR VEHICLES

BACKGROUND OF THE INVENTION

The invention concerns a variable dashpot for motor vehicles. The cylinder is fastened to the unsprung wheel mass. The piston rod is fastened by way of a fastener to the springmounted body. The piston rod is hollow and accommodates electric connections that extend to one or more sensors and/or one or more valves. The connections are also connected by way of male and female connectors to additional connections that extend to processing and activating circuitry.

When a variable dashpot is installed in a vehicle, the connections that extend through the piston rod to the sensors and valves must also be connected to the connections that extend to the processing and activating circuitry, which is inside the vehicle. This objective can be attained as described in German OS 2 911 768 by way of male and female connectors outside the piston rod. This approach, however, makes it more difficult to install the dashpot because the connections to the connectors must extend through a bore in the vehicle's body.

Furthermore, the relatively sensitive connections and connectors can be damaged while the dashpot is being shipped and installed.

German Patent 3 313 388 eliminates this drawback with male and female connectors between the connections that extend through the piston rod and those that extend to the processing and activating circuitry. The male connector is sunk in a depression in the end of the piston rod and the matching female connector is inserted into the depression and connected to the male connector once the dashpot has been installed in the vehicle. This approach simplifies installing the dashpot and extensively eliminates the risk of damage to the connections and connectors. Still, particles of dirt can penetrate into the depression in the end of the piston rod while the dashpot is being shipped and installed, to the detriment of the electric contact. Again, the dashpot is heavy and can damage the prongs on the male connector during shipment. Finally, boring the depression in the end of the piston rod constitutes an additional manufacturing step.

SUMMARY OF THE INVENTION

The object of the invention is a dashpot for motor vehicles that is easy to install against the body of the vehicle, that will constitute almost no threat to the male and female connectors, and that will ensure satisfactory contact between the male and the female connector. Again, even narrow piston rods will be able to accommodate the connectors.

This object is attained by providing that the female connector is connected to the connections that extend through the piston rod to the sensors and valves in the dashpot and is secured in the top of the piston rod. The lower surface of the female connector in one advantageous embodiment is level with the upper end surface of the piston rod. There is accordingly no recess at the top of the piston rod for hard-to-remove particles of dust to accumulate in. The bottom of the female connector in another advantageous embodiment of the invention has a pin-like component. The female connector is secured in the piston rod only by the pin-like, component, and the connector itself rests against the upper end surface of the piston rod. A protective sleeve can be slid over the connectors when the male connector is inserted to protect them from splashing and dirt.

The advantage of this embodiment is that no additional longer-diameter recess has to bored in the end of the piston rod to sink the female connector into. The connectors can accordingly be employed even with narrow piston rods.

BRIEF DESCRIPTION OF THE DRAWINGS

The invention will now be specified with reference to the accompanying drawing, wherein.

DESCRIPTION OF THE PREFERRED EMBODIMENTS

Figure 1:
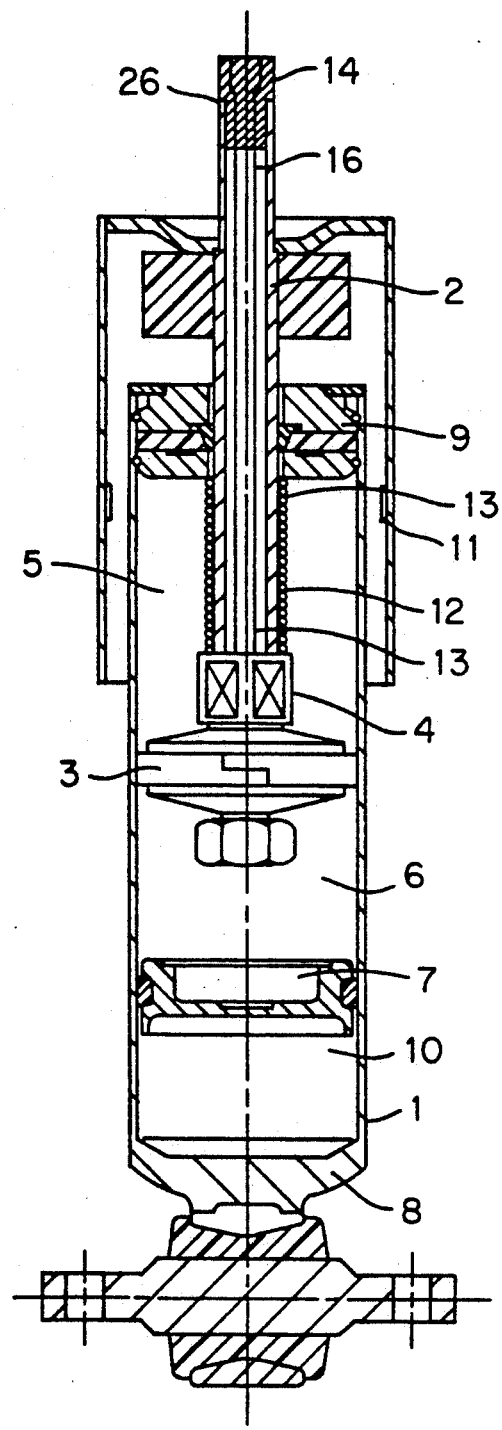
FIG. 1 illustrates a single-pile dashpot with a variable bypass valve.

The single-pipe dashpot illustrated in FIG. q constitute essentially of a cylinder 1 full of hydraulic fluid. The bottom of the cylinder is sealed off by a base 8 and its top by a gasket 9. A piston rod 2 extends into the cylinder through gasket 9 and terminates inside the cylinder in a piston 3. The bottom of the cylinder is fastened to the unsprung wheel mass. The top of piston rod 2 is fastened, by way of a nut for example, to the vehicle's body. Piston 3 is provided with a bypass valve 4 and separates cylinder 1 into two chambers 5 and 6. Lower chamber 6 is demarcated by a partition 7. Below partition 7 is a gas-filled chamber 10 that compensates for changes in the capacity of the hydraulics chamber that occur as piston rod 2 enters and leaves it.

A parametric signal for bypass valve 4 is detected by a speed-difference detector. This instrument comprises a coil 12 that surrounds piston rod 2 and operates in conjunction with a permanent magnet 11. The electric connections 13 to bypass valve 4 and coil 12 extend through piston rod 2 to a female connector 14 in the top of the rod. A male connector 15 is connected to connections that lead to processing and activating circuitry. Male connector 15 is inserted into female connector 14 once the dashpot has been mounted on the vehicle's body.

Figure 2:
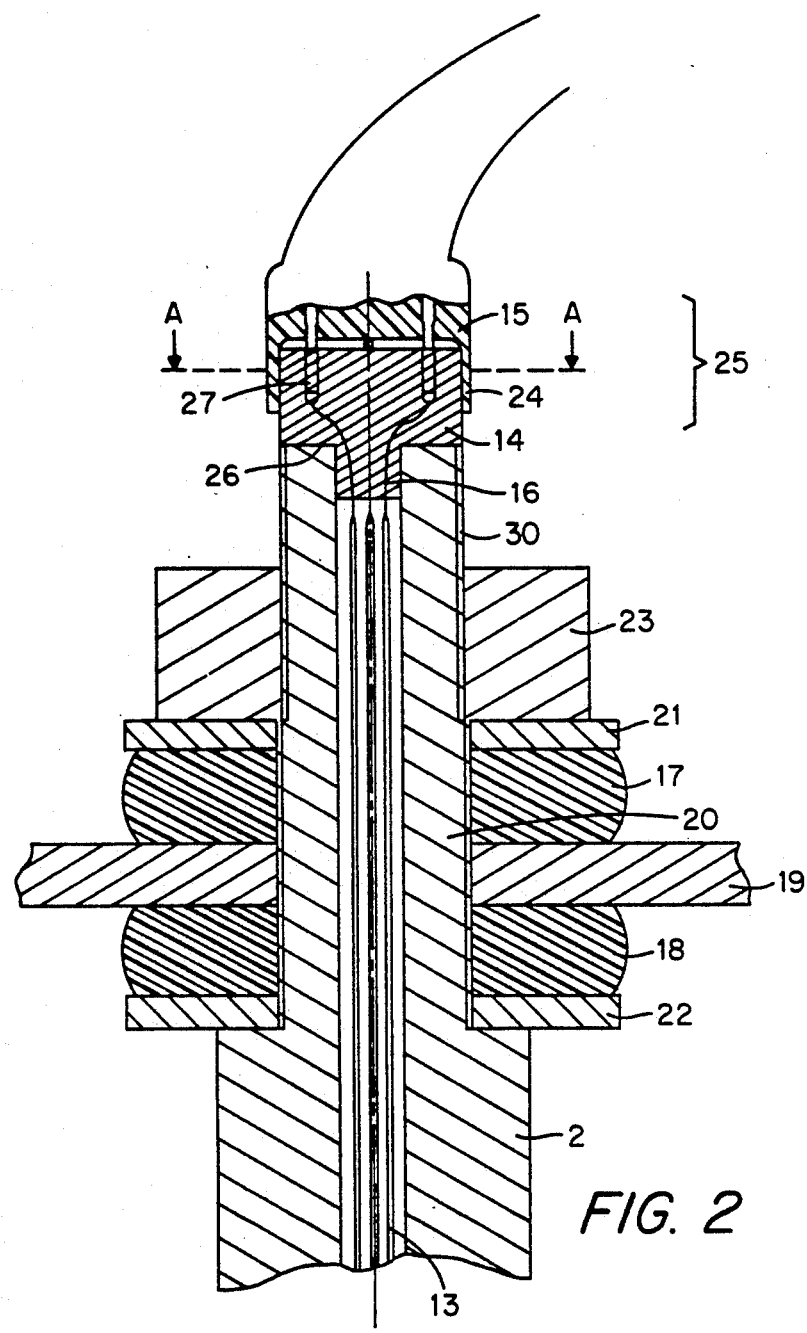
FIG. 2 represents the connectors on the piston rod subsequent to installation in a vehicle.
Figure 2A:
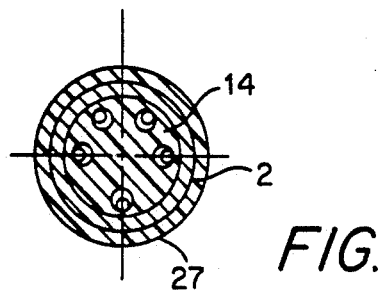
FIG. 2a is a schematic representation of how the prongs are protected in a sectional view taken along line A—A in FIG. 2.

FIG. 2 illustrates the male and female connectors in accordance with the invention once the dashpot has been mounted on the vehicle body.

When in particular the vectors of motion are equal at all levels of the upper and lower suspension while the vehicle is traveling, piston rod 2 can be pivoted to the vehicle's body. In this event the piston rod will be accommodated in a bore 20 that extends through a vehicle-body flange 19 and through a rubber pad 17 and 18 on each side. Pads 17 and 18 are compressed by washers 21 and 22 and by a lock nut 23. Female connector 14 is mounted at the top of piston rod 2 such that a projection 16 with a diameter that is shorter than that of the female connector itself, will be received therein. Female connector 14 rests against the upper end surface 26 of piston rod 2. It is of advantage for the diameter of female connector 14 to equal the inside diameter of the thread 30 around the top of piston rod 2.

Once the dashpot has been mounted on flange 19, male connector 15 is connected to female connector 14 and protected by a plastic sleeve 24.

The female connector 14 can have a diameter which is as long as the inside diameter of the threaded section 30 at the top of the piston rod 2. At the same time, the lower surface of the female connector 14 may engage the upper end surface of the piston rod 2 projection 16, furthermore, may be mechanically secured in the piston rod 2.

The connectors in accordance with the invention can be used with piston rods of any diameter and require no additional operation to bore a depression in the rod. The connections inside bypass valve and sensors are protected, and the electrical contacts cannot be affected by difficult-to-remove dirt.

To prevent the prongs or pins on the male connector from entering the wrong holes in the female connector, prongs 27 and accordingly the holes in the female connector can by asymmetrical.

I claim:

1. A variable dashpot for motor vehicles with a vehicle body, comprising: a hollow piston rod secured to said vehicle body by fastening means; electrical connections in said hollow piston rod for connecting selectively to sensor means and controllable valve means; male and female connectors for connecting said connections additionally to processing and activating circuit means; said male and female connectors being held at a top region and said hollow piston rod, said male connector being connectable to said female connector; a projection on a lower end of said female connector insertable and securable in said piston rod until said female connector rests against the upper end surface of said piston rod with an upper part of said female connector receiving pins of said male connector, said projection being directly insertable into a front side of an open hollow space of said hollow piston rod, wherein said female connector and said projection each have a diameter, the diameter of said projection being shorter than the diameter of the female conector.

2. A variable dashpot for motor vehicles as defined in claim 1 wherein said piston rod has an upper threaded section with an inside diameter, said female connector having a diameter substantially equal in length to said inside diameter of said threaded section.

3. A variable dashpot for motor vehicles as defined in claim 1, wherein said female connector has openings for receiving the pins of said male connector, said holes and pins being distributed asymmetrically.

4. A variable dashpot for motor vehicles as defined in claim 1, wherein said female connector is secured on said piston rod.

5. A variable dashpot for motor vehicles as defined in claim 1, wherein said projection is secured in said piston rod.

6. A variable dashpot for motor vehicles as defined in claim 1, wherein said female connector has a lower surface engaging said upper end surface of said piston rod.

7. A variable dashpot for motor vehicles with a vehicle body, comprising: a hollow piston rod secured to said vehicle body by fastening means; electrical connections in said hollow piston rod for connecting selectively to sensor means and controllable valve means; male and female connectors for connecting said connections additionally to processing and activating circuit means; said male and female connectors being held at a top region of said hollow piston rod, said male connector being connectable to said female connector; a projection on a lower end of said female connector insertable and securable in said piston rod until said female connector rests against the upper end surface of said piston rod with an upper part of said female connector receiving pins of said male connector; said projection being directly insertable into a front side of an open hollow space of said hollow piston rod, said female connector and said projection each having a diameter, the diameter of said projection being shorter than the diameter of said female connector; said piston rod having an upper threaded section with an inside diameter, said female connector having a diameter substantially equal in length to said inside diameter of said threaded section; said female connector having a lower surface engaging said upper end surface of said piston rod; said female connector having openings for receiving the pins of said male connector, said openings and pins being distributed asymmetrically, said female connector being secured on said piston rod.

* * * * *